Nov. 8, 1932.　　　　L. B. SPERRY　　　　1,887,335
AUTOMATIC PILOT FOR AIRCRAFT
Original Filed March 30, 1923　　3 Sheets-Sheet 1
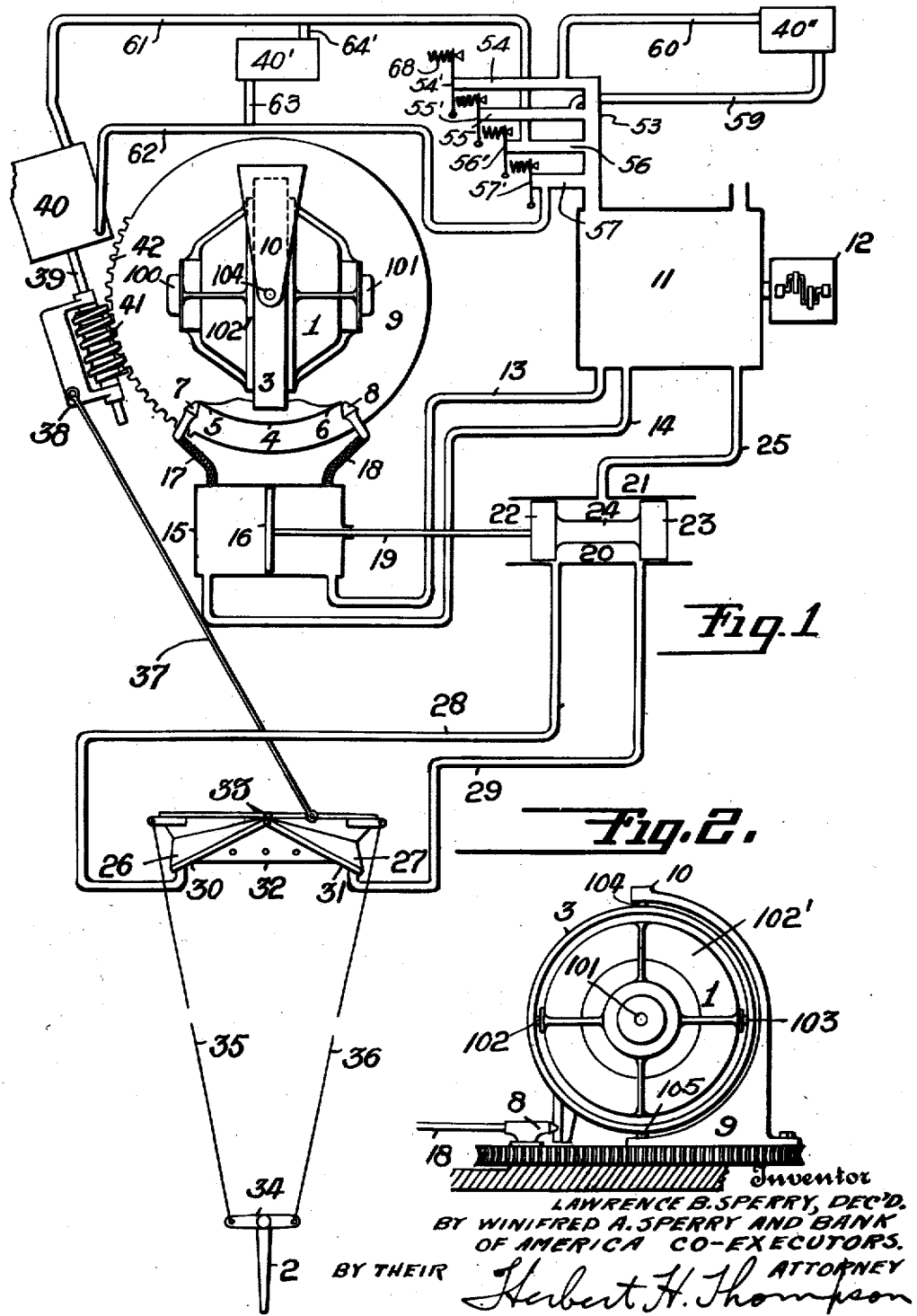
Inventor
LAWRENCE B. SPERRY, DEC'D.
BY WINIFRED A. SPERRY AND BANK
OF AMERICA CO-EXECUTORS.
BY THEIR
Herbert H. Thompson
ATTORNEY

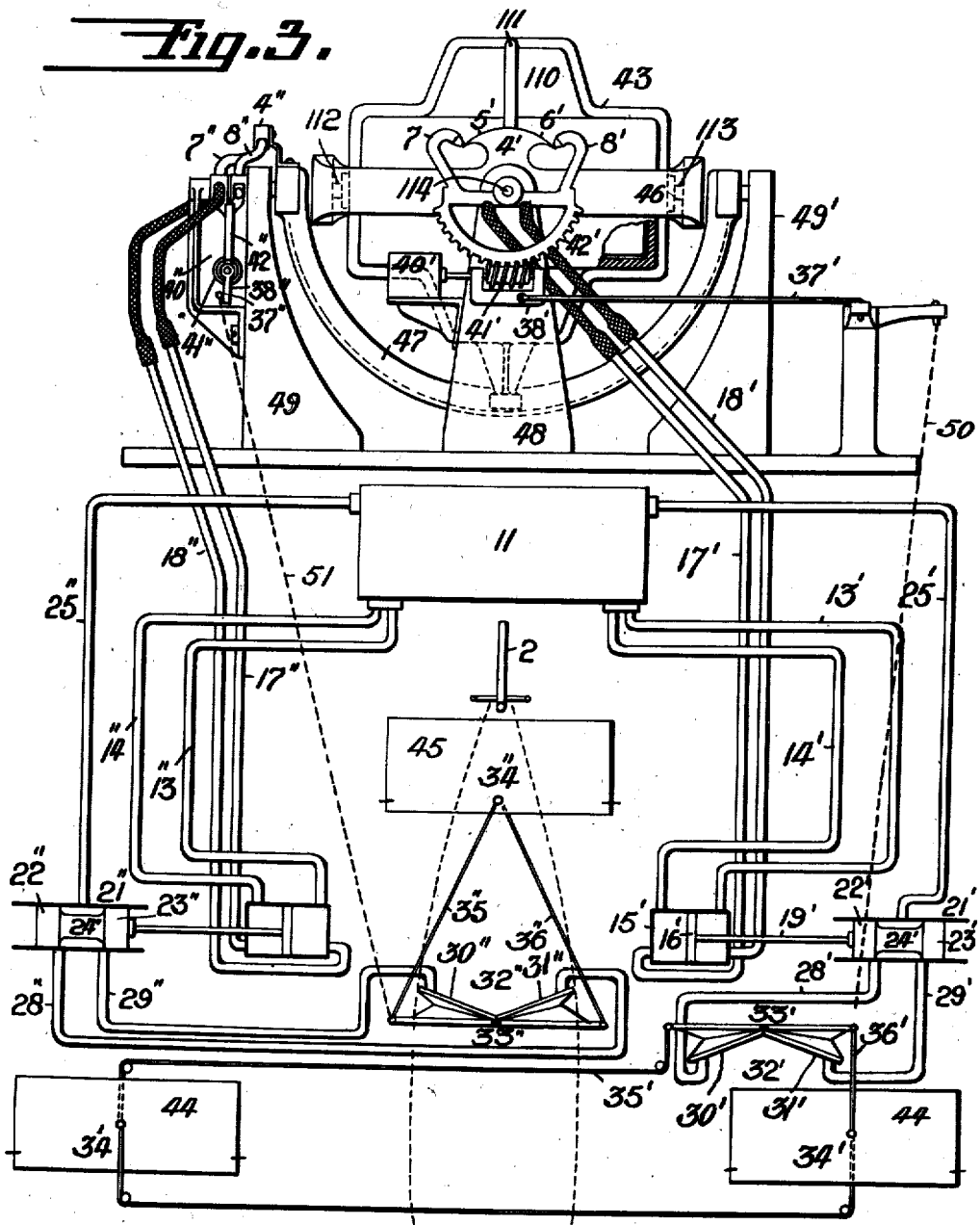

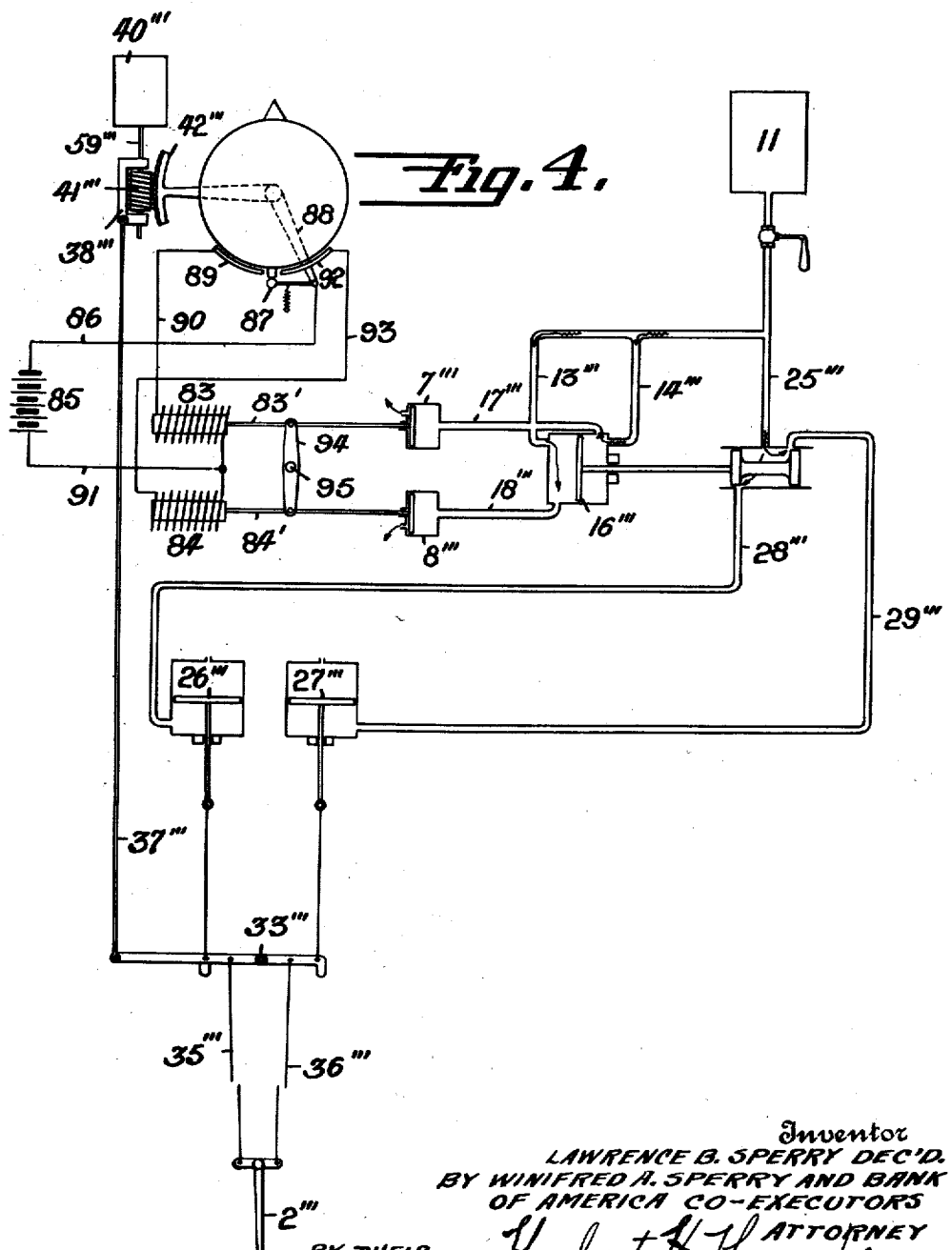

Patented Nov. 8, 1932

1,887,335

UNITED STATES PATENT OFFICE

LAWRENCE B. SPERRY, DECEASED, LATE OF GARDEN CITY, NEW YORK, BY WINIFRED A. SPERRY AND BANK OF AMERICA, CO-EXECUTORS, OF NEW YORK, N. Y.

AUTOMATIC PILOT FOR AIRCRAFT    REISSUED

Continuation of application Serial No. 628,781, filed March 30, 1923. This application filed November 9, 1929, Serial No. 405,939. Renewed February 17, 1932.

This invention relates to an automatic control system for aircraft, aerial torpedoes, or other dirigible vessels and has for its object the provision of an improved device of this character. This application is a continuation of copending application filed March 30, 1923, Serial No. 628,781, certain parts thereof, however, having been divided out.

More specifically, the invention relates to such an automatic aircraft in which one or more gyroscopes are employed in the control system. Usually one gyroscope having a horizontal spinning axis is employed to control the vertical or steering rudder for the movement to the right or left of the craft, and a second or stabilizing gyroscope having a vertical spinning axis is employed to control the horizontal rudder, generally known as the elevator, or up and down movement of the craft, and the ailerons, or the banking of the torpedo. Such a system is shown in the copending patent of Elmer A Sperry, No. 1,792,937, dated February 17, 1931, for wireless controlled aerial torpedo. The invention is applicable to an airplane provided with either of said gyroscopes, or both of them. In conjunction with the gyroscopes, is employed an air system, which may have either a negative or a positive pressure, having control valves for the several elements to be actuated, which valves are in turn controlled by the gyroscopes. It is, of course, understood that the steering gyroscope preferably has three degrees of freedom, and, therefore, maintains its position in space, while the stabilizing gyroscope is preferably in the form of a gyroscopic pendulum. There is also provided a novel follow-up system for said gyroscopes. With the apparatus thus far mentioned, in flight the airplane will automatically maintain its direction, in both the vertical and the horizontal planes.

For the purpose of changing the direction of the aircraft in either the horizontal or vertical plane, banking the craft or actuating other local devices, the same air system is employed, which, for purposes of illustration, is shown as a vacuum system, connected to a master valve. This valve has separate connections to several air motors which work through respective gyroscopes in a manner to be fully described hereinafter, which connections are normally closed.

The invention will be better understood from the following description taken in connection with the accompanying drawings and its scope will be pointed out in the appended claims.

In the drawings, illustrating what is now considered the preferred form of the invention, Fig. 1 is a plan view of the steering gyroscope for controlling the steering rudder, with a diagram illustrating the air system and connections.

Fig. 2 is an elevation of the gyroscope shown in Fig. 1, showing the details of the follow-up system.

Fig. 3 is a side elevation of the stabilizing gyroscope for controlling the horizontal rudder and ailerons, with a diagram illustrating the air system and connections.

Fig. 4 is a diagrammatic showing of a modification of Fig. 1, in which an electrical control system is shown.

Referring now to the drawings, the numeral 1 in Fig. 1 indicates the steering gyroscope unit for controlling the vertical rudder 2. This unit comprises a gyroscope mounted on a horizontal spinning axis, 100, 101 in casing 102', which is mounted for oscillation about a horizontal axis 102, 103 in vertical ring 3, journaled in frame 10 on vertical axis 104, 105, and may be of the type disclosed in Patent No. 1,521,132, dated December 30, 1924 for gyroscopic apparatus for aeroplanes. Such a gyroscope is designed to possess three degrees of freedom, so as to maintain its position in space. Frictionless means are preferably employed to transmit the position of the gyroscope to a distant point for effecting the control of the aerial device. For this purpose there is suitably mounted on the vertical ring 3 of the gyroscope, a segment 4 curved about the pivotal axis 104 of the gyroscope as a center, the ends 5, 6 thereof being sharpened to knife edges. Adjacent the ends 5, 6 are nozzles 7, 8, respectively, which are substantially radially directed with reference to segment 4 and which are connected with any suitable means for creating negative or positive air pressure, as will be described hereinafter. The nozzles 7, 8 are spaced so that they may be partially or almost entirely closed simultaneously by the ends 5, 6, respectively, a small clearance remaining to permit a slight leakage. Said nozzles are fixed to a base 9 which is rotatable about the axis of the gyro frame 10. By the construction of segment 4 and nozzles 7 and 8 as described, the lateral reaction or thrust from the air entering the nozzles on the gyroscope is minimized.

From the foregoing, it will be seen that as either nozzle is uncovered by the adjacent knife edge, air will pass therethrough at a greater rate than through the other, since as one nozzle is uncovered, the other will be covered. However, in the normal position shown in Fig. 1, the same volume of air may leak through both nozzles. For the purpose of illustrating my invention, I have shown a negative air pressure system, a vacuum reservoir or tank being shown at 11, having an air pump 12, which may be of any standard type. The tank 11 is connected by passages 13, 14 to the opposite ends of a closed cylinder 15, which is provided with a reciprocating piston 16. The opposite ends of the cylinder 15 are also connected by flexible passages 17, 18 to nozzles 7, 8 respectively. It will, therefore, be readily understood that when the knife edges 5 and 6 are in their normal position, the piston 16 will assume a middle or neutral position, as shown in Fig. 1, and that when either of the nozzles 7, 8 are uncovered, an unbalanced condition is set up in the cylinder 15 and the piston 16 moves accordingly. The piston 16 is provided with a stem 19, which is secured to the valve 20. The latter valve is, therefore, actuated by the reciprocation of the piston 16. As shown, the piston valve 20 is within an open ended cylinder 21, and is in the form of a double piston, the faces 22, 23 of which are united by a small neck 24. The chamber of cylinder 21 formed between the faces 22, 23 is connected by a passage 25 with the tank 11. The cylinder 21 is also connected with similar bellows 26, 27 by passages 28, 29, respectively. The passages 28, 29 are located at opposite ends of the cylinder 21, and are spaced to be evenly covered by the piston faces 22, 23 when the piston 16 is in its neutral position, so that in such a position a slight leakage is permitted, which will maintain the bellows 26, 27 in a balanced condition. When the piston 16 is moved to the right, the valve 20 uncovers passage 28, connecting it to the atmosphere, and connects the passage 29 entirely with the tank 11. When piston 16 moves in the opposite direction, passage 29 is connected to air, and passage 28 is connected to the tank 11. The lower sides 30, 31 of bellows 26, 27 are rigidly mounted on a fixed base 32 and are placed at an angle to each other. The upper sides of the bellows are united in a single flat element 33, pivoted to rock about a center at which the sides 30, 31 meet. The passages 28, 29 are flexible to permit the free movement of the member 33. The rudder 2 is provided with a cross piece 34, the opposite ends of which are suitably secured to the respective opposite ends of element 33 by wires 35, 36.

The follow-up system is represented as shaft 37, pivotally connected to the element 33 at one end, and at its opposite end engaging the rotatable base 9. The engaging means comprises a U-shaped bracket 38 pivotally connected to shaft 37, which bracket is slidably mounted on a shaft 39 of an air motor 40. Between the arms of the bracket 38, is a worm 41 meshing with a gear 42 on the periphery of base 9. The worm is slidable on the shaft 39, but rotatable therewith for a purpose hereinafter to be described. Therefore, any motion of shaft 38 reciprocates worm 41 on shaft 39 and thereby rotates the base 9 accordingly.

From the foregoing it will be seen that if the aerial carrier deviates from its course to the right or left, in accordance with well known gyroscopic principles, the gyroscope maintains its position in space, and the base 9 turns relatively to the gyro. Assuming that the craft has turned counterclockwise, the base 9 moves counterclockwise with respect to the gyro, causing nozzle 8 to be uncovered and nozzle 7 to be covered by segment 4. This causes piston 16 to move to the left, thereby moving valve 20 to the left to connect passage 28 with tank 11 and passage 29 to air. This causes bellows 26 to collapse whereby element 33 through the medium of wire 36 moves rudder 2 counterclockwise. When the bellows 26 is collapsed, the element 33 is rocked counter-clockwise, thereby moving the shaft 37, which through its connection to rotatable base 9, moves said base clockwise until the segment 4 reassumes its normal position with respect to nozzles 7, 8. In this manner the aircraft torpedo may be automatically maintained on the course controlled by the vertical rudder, but a graduated movement of the rudder is secured instead of the "hard over" system employed on under-water torpedoes.

In Fig. 3 is shown the stabilizing gyroscope unit 43 for controlling the ailerons 44, or the banking of the aerial torpedo and the horizontal rudder 45, or the up and down movement of said torpedo. The gyroscope is shown as mounted in a casing 110 on a spinning axis 111, the casing being pivoted in gimbal ring 46 on horizontal axis 112, 113. Said ring in turn is pivoted in brackets 48 on horizontal axis 114. The segment 4' for controlling the ailerons is carried by the gimbal ring 46, and the segment 4" for controlling the horizontal rudder 45, by the loop or bail 47, pivoted outside of the ring 46 on brackets 49 and 49'. The devices controlled by the segment 4' are identical with those shown in Fig. 1 and above described, and, therefore, need not again be described. The similar parts have been given similar reference numerals, those relating to the ailerons being primed and those relating to the horizontal rudder being double-primed. Due to the different planes of operation, the gears 42' and 42" are respectively pivoted on vertical standards 48 and 49 instead of on the base 9 as shown in Fig. 1. For the same reason, it has been necessary to connect the rods 37' and 37" to their respective bellows controlled elements 33' and 33" by wires 50 and 51. A single element 33' is provided to operate both ailerons 44, which are connected to move oppositely in a manner readily understood. From this it will be seen that the airplane may also be automatically maintained on the course controlled by the ailerons and horizontal rudder.

For controlling the course of the airplane after it is once in flight valves may be provided for operating the motors 40, 40' and 40". These three motors respectively control the vertical rudder or the right and left movement, the ailerons or the banking movement, and the horizontal rudder or the up and down movement, in a similar manner, which will be understood from Fig. 1. As there shown the motor 40, which may be any suitable type of air motor, drives the shaft 39 in either direction which shaft carries the worm 41, as hereinbefore described. The worm 41 meshes with gear 42 and rotates it clockwise or anti-clockwise, which of course displaces the nozzles 7, 8 carried by it, with respect to edges 5, 6. When this occurs, the device controlled by the respective motor 40 is actuated in the manner hereinbefore described. When the base 9 is rotated clockwise, the result is the same as if the follow-up rod 37 had been lengthened and when rotated anti-clockwise, the result is the same as if the rod 37 of the follow-up system had been shortened. With the arrangement described, it will be seen that by driving the motors 40, 40' and 40", in either direction, the course of the aircraft may be altered, and that the follow-up system is simultaneously adjusted to the altered course, and, therefore, the aircraft is automatically maintained thereon. To this end there are shown four short pipes 54, 55, 56 and 57 in communication with a passage 53 connected to the tank 11 and which are open at their free ends. In practice these pipes are arranged along side each other as indicated in Fig. 1.

The passage 54 communicates with one end of air motor 40" through passage 59 and passage 55 communicates with the opposite end of air motor 40" through passage 60. The passage 56 communicates with one end of air motor 40 through passage 61, and passage 57 communicates with the opposite end of air motor 40 through passage 62. The motor 40' is connected at one end to passage 62 by passage 63 and at its opposite end to passage 61 by passage 64', that is, in parallel with motor 40. As above indicated, the motor 40 controls the right and left movement, and the motor 40' the banking movement, and as is well understood by those skilled in the art, the vertical rudder and ailerons are operated together. The motors 40 and 40' are accordingly connected for simultaneous operation. The open ends of passage 54 to 57 inclusive are normally closed by padded fingers 54' to 57' inclusive. The fingers 54' to 57' are each normally held in closed position by any suitable means, such as by springs 68. When it is desired to turn in one direction, one of valves 56' or 57' is opened either directly or indirectly through relays (not shown) by the operator. This alters the pressure in pipe 61 or 62 and thus causes the motor 40 to turn in one direction, thus turning the worm 41 and the base 42 slowly around the gyroscope as long as the valve is held open. As soon, however, as the valve is closed, the motor stops. The result is that the entire airplane is brought around to the new course through the operation of the jets 7 and 8 and the rudder 2, as above explained. At the same time the motor 40' is operated to automatically bank the plane. Similarly valves 54', 55' are operated to control the angle of attack of the airplane.

In Fig. 4 is shown a modified form of the device shown in Fig. 1, in which similar reference numerals have been applied to similar parts, but triple-primed. Herein the nozzles 7, 8 are replaced by cylinders 7"' and 8"', which are actuated by oppositely wound solenoids 83, 84, respectively. The circuit of solenoid 83 comprises a battery 85, conductor 86 to a movable trolley 87 on the follow-up element 88, contact 89, conductor 90, through the solenoid, and conductor 91. The circuit of solenoid 84 comprises battery 85, conductor 86, trolley contact 87, contact 92, conductor 93, through the solenoid and conductor 91 to the battery 85. The solenoids 83, 84 are provided with rods 83', 84' carrying pistons within chambers 7"', 8"', and said rods may be pivoted to the opposite ends of a rocker 94 pivoted on a center 95. In this case, the element 88 corresponds to the base 9 in Fig. 1, and the contacts 89, 92 are carried by the gyro ring 4, and move in a manner similar to the segment 4 in Fig. 1. This arrangement is well understood in the art. Otherwise the operation is similar to that described in connection with Fig. 1.

In accordance with the provisions of the patent statutes, there is herein described the principle of operation of the invention, together with the apparatus, which is now considered to represent the best embodiment thereof, but it is desired to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described the invention what is claimed and desired to secure by Letters Patent is:

1. In a control system for aircraft, a pressure source, means connected with said source for actuating a control surface, means connected with said source for controlling said actuating means responsive to pressure changes, a gyroscope for differentially effecting pressure changes in said latter means, and means for altering the relation between the gyroscope and pressure source for effecting changes in course through the gyroscope.

2. In an aerial control system for aircraft, the combination with a gyroscope, of means for automatically controlling a control surface therefrom comprising a pressure source, means for actuating said surface connected with said source, a valve for controlling the connection between said source and said surface actuating means, a cylinder and piston for controlling said valve, differential air flow ports connected with said cylinder and actuated by said gyroscope whereby differential pressure changes are effected on the two sides of said piston and follow-back means to said ports controlled by said surface.

3. In combination, a dirigible vehicle, a gyroscope mounted thereon, a pressure source, means for actuating a control surface connected with said source, means for controlling said actuating means responsive to changes in pressure, means for effecting pressure changes in said latter means controlled by relative movement between the vehicle and the gyroscope in the plane controlled by said surface, and means for also effecting the operation of said last-named follow-up means.

4. In combination, a dirigible vehicle, a gyroscope mounted thereon for freedom about a vertical axis, means for automatically maintaining the vehicle on a set course in azimuth comprising a follow-up connection between the gyroscope and the control surface, a differential pressure system for actuating the control surface controlled by the gyroscope, and means for changing the course of said vehicle by varying the effective relation of the follow-up connection to the gyroscope.

5. In a control system for a dirigible vehicle, the combination comprising a gyroscope, a pressure source, means for actuating a control surface connected with said source, means for controlling said actuating means comprising elements carried by the gyroscope and by the vehicle, the control being effected by the relative movement between said elements, a follow-up element connected with the control surface and the vehicle element, and course-changing means for relatively moving said elements to adjust the follow-up element to the new relation.

6. In a dirigible vehicle, the combination comprising a control surface, a plurality of control elements one of which is gyroscopically stabilized and the others of which are rotatably mounted, means for rotating the latter elements comprising an axially slidable and rotatable worm, a follow-up connection between said surface and said worm and a change course device also connected thereto.

7. In a gyroscopic control apparatus, the combination with a gyroscope, a pair of air ports mounted adjacent thereto, pivot means for rotatably mounting the same, a lead-out pipe for each port, an intercepting plate on the gyroscope adjacent said ports, a servo motor actuated from the differential air pressure in said pipes, and a follow-back connection to said pivoted air ports to turn the same.

8. The combination with a control gyroscope for dirigible vehicles mounted for turning about an axis, of means for automatically controlling the dirigible vehicle therefrom, comprising a plurality of substantially radially directed nozzles, a curved segment having sharpened edges, said nozzles and said segment being adapted to create a differential flow of air through said nozzles on relative angular displacement of said vehicle and gyroscope, and means brought into action by said differential flow through the nozzles for controlling the course of the vehicle.

9. The combination with a control gyroscope for dirigible vehicles mounted for oscillation about an axis, of means for automatically controlling the dirigible vehicle therefrom, comprising a plurality of air intake nozzles mounted on said vehicle, a segment on the gyroscope having sharpened edges lying adjacent said nozzles and curved about said axis as a center adapted to create a differential flow of air through said nozzles on relative angular displacement of said vehicle and gyroscope, and means brought into action by said differential flow through the nozzles for controlling the position of the vehicle.

10. The combination with a control gyroscope for dirigible vehicles mounted for oscillation about an axis, of means for automatically controlling the dirigible vehicle therefrom, comprising a plurailty of nozzles mounted on the vehicle and radially directed with respect to said axis, a segment on the gyroscope having sharpened edges lying adjacent said nozzles and curved about said axis as a center adapted to create a differential flow of air through said nozzles on relative angular displacement of said vehicle and gyroscope, and means brought into action by said differential flow through the nozzles for controlling the position of the vehicle.

11. The combination with a steering gyroscope for dirigible vehicles mounted for turning about a vertical axis, of means for automatically controlling the dirigible vehicle therefrom, comprising a plurality of substantially radially directed nozzles mounted on said vehicles, a curved segment having sharpened edges on the gyroscope adapted to create a differential flow of air through said nozzles on relative rotation of said vehicles and gyroscope, and means brought into action by said differential flow through the nozzles for controlling the course of the vehicle.

In testimony whereof we hereby affix our signatures.

WINIFRED A. SPERRY,
BANK OF AMERICA,
By W. J. MONTGOMERY,
Co-Executors of the Estate of Lawrence B. Sperry, Deceased.

CERTIFICATE OF CORRECTION.

Patent No. 1,887,335.

November 8, 1932.

WINIFRED A. SPERRY, ET AL.

It is hereby certified that error appears in the printed specification of the the above numbered requiring correction as follows: Page 4, line 51, claim 3, strike out the word "follow-up" and insert the same before " means" in line 49, of said claim; and that the said Letters Patent should be read with this correction therein that the same may conform to the record of the case in the Patent Office.

Signed and sealed this 5th day of March, A. D. 1935.

Leslie Frazer (Seal)

Acting Commissioner of Patents.

on the gyroscope having sharpened edges lying adjacent said nozzles and curved about said axis as a center adapted to create a differential flow of air through said nozzles on relative angular displacement of said vehicle and gyroscope, and means brought into action by said differential flow through the nozzles for controlling the position of the vehicle.

11. The combination with a steering gyroscope for dirigible vehicles mounted for turning about a vertical axis, of means for automatically controlling the dirigible vehicle therefrom, comprising a plurality of substantially radially directed nozzles mounted on said vehicles, a curved segment having sharpened edges on the gyroscope adapted to create a differential flow of air through said nozzles on relative rotation of said vehicles and gyroscope, and means brought into action by said differential flow through the nozzles for controlling the course of the vehicle.

In testimony whereof we hereby affix our signatures.

WINIFRED A. SPERRY,
BANK OF AMERICA,
By W. J. MONTGOMERY,
Co-Executors of the Estate of Lawrence B. Sperry, Deceased.

CERTIFICATE OF CORRECTION.

Patent No. 1,887,335.                                  November 8, 1932.

WINIFRED A. SPERRY, ET AL.

It is hereby certified that error appears in the printed specification of the the above numbered requiring correction as follows: Page 4, line 51, claim 3, strike out the word "follow-up" and insert the same before " means" in line 49, of said claim; and that the said Letters Patent should be read with this correction therein that the same may conform to the record of the case in the Patent Office.

Signed and sealed this 5th day of March, A. D. 1935.

Leslie Frazer (Seal)                                                  Acting Commissioner of Patents.

CERTIFICATE OF CORRECTION.

Patent No. 1,887,335.  November 8, 1932.

WINIFRED A. SPERRY, ET AL.

It is hereby certified that error appears in the printed specification of the the above numbered requiring correction as follows: Page 4, line 51, claim 3, strike out the word "follow-up" and insert the same before " means" in line 49, of said claim; and that the said Letters Patent should be read with this correction therein that the same may conform to the record of the case in the Patent Office.

Signed and sealed this 5th day of March, A. D. 1935.

Leslie Frazer (Seal)  Acting Commissioner of Patents.